July 2, 1957     E. H. BALZ ET AL     2,798,020
METHOD OF MAKING A GLASS FIBER REINFORCED RESINOUS PRODUCT
Filed June 23, 1953
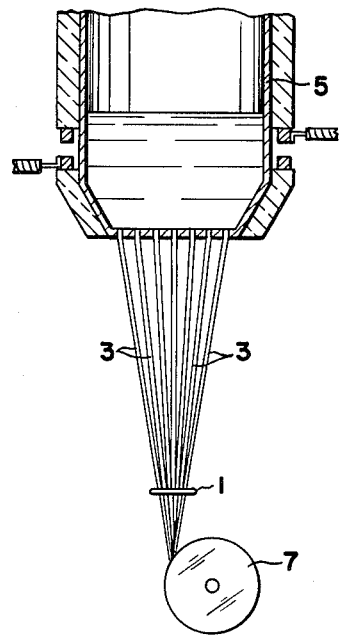
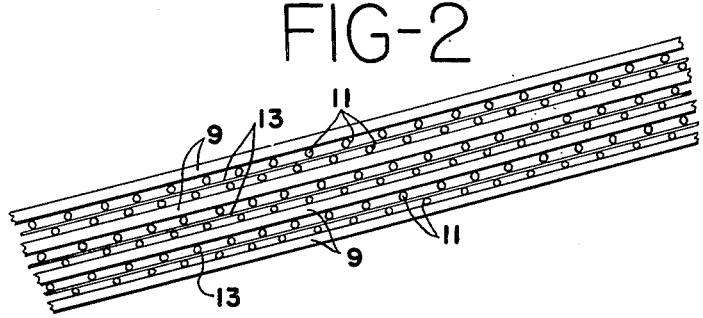
INVENTOR.
EMIL H. BALZ
BY Toulmin & Toulmin
ATTORNEYS United States Patent Office 2,798,020
Patented July 2, 1957

2,798,020

METHOD OF MAKING A GLASS FIBER REINFORCED RESINOUS PRODUCT

Emil H. Balz, Leroy F. Ornella, and Jaclyn Dohm Villwock, Toledo, Ohio, assignors, by mesne assignments, to L. O. F. Glass Fibers Company, Toledo, Ohio, a corporation of Ohio Application June 23, 1953, Serial No. 363,623

6 Claims. (Cl. 154—90)

This invention relates to glass reinforced plastic products and particularly to compositions useful in connection with fibrous glass and the methods of employing the compositions for the improvement of the characteristics of the product.

In co-pending application of Emil H. Balz, Serial No. 235,161, filed July 5, 1951, now U. S. Patent No. 2,700,010 assigned to the same assignee as the present invention, there is described a method of cleaning glass cloth and thereafter treating the same with an acid, such as formic acid, prior to the formation of a laminate of the glass cloth with resins. In that application it is stated that the acid treatment of the cloth is of assistance in the attainment of improved laminates.

This application is also related to co-pending application of Emil H. Balz, et al., Serial No. 299,918, filed July 19, 1952, and assigned to the same assignee as the present invention.

This invention contemplates the provision of improvements relating to the formation of glass reinforced plastic products and involves the employment of a novel binder composition in conjunction with an acid treated glass surface. In the method of this invention a polyester resin and an organo-silicon dissolved therein are applied to the binder-treated glass fabric and the resin to be reinforced serves as a reactant with the surface of the glass cloth, this action and polymerization occurring simultaneously; the binder composition on the glass, quite unexpectedly, does not interfere with this reaction and the cured product is a translucent reinforced plastic of high strength.

We have also found that this application of the organosilicon dissolved in the polyester to glass which has been binder and acid treated under limiting conditions results in the attainment of reinforced products of materially improved wet strength. Moreover the production of the reinforced product or laminate as the case may be is accomplished at the relatively low curing temperature of the polyester itself in contrast to direct treatments with silanes where temperatures of over 500° F. are required.

The organo-silicon which is dissolved in the polyester contains in its molecule a first group capable of reacting with the surface of the acid treated glass; the molecule also contains a second group which is an unsaturated organic radical susceptible of copolymerizing with the polyester resin. This molecular arrangement and the application of the polyester resin and organo-silicon in one operation create conditions which are most favorable to the development of adhesion to the glass and copolymerization between the polyester and organo-silicon.

The binder treatment of the glass may take place immediately after filament formation; to effect this in the preferred manner an acid-containing binder composition is applied to the glass fibers as they are drawn from the glass melting pot. The acid of the composition, it is believed, is effective to induce the formation of an abundance of hydroxyl groups on the glass filament surface which surface is then receptive to the organo-silicon; the acid treatment of the fibers as they are drawn from the pot may if it is desired take place separately from binder application.

The binder composition itself is, as noted, such that it does not obstruct the contact of the glass with the organosilicon contained in the polyester resin in the subsequent reinforcing process. This is of great importance in connection with the formation of glass fiber rovings into glass reinforced products for the fibers may be formed after binder treatment directly into rovings, the roving package dried and thereafter the rovings impregnated with the resinous material in which is dissolved the above described silane, and then the same is cured at relatively low temperatures. This factor also is of importance in connection with processes wherein the drawn glass is binder treated as it is drawn, whereafter the product may be woven and then resin treated without binder removal; the binder coated glass may also be employed in a preform process and may for example be in chopped form, the resin impregnation taking place thereafter.

It is accordingly a primary object of this invention to provide a binder which when applied to glass fibers securely retains the same together but which does not pull free of the fibers when the same are separated.

A further objective of the invention is the provision of binder-coated glass fibers, the binder of which does not obstruct the bonding of resins to the surface of the glass; consequently the need for removal of the binder before lamination with resins is eliminated.

An important object of the invention is the provision of a binder on glass cloth which when combined with a silane dissolved in a polyester produces on curing a translucent reinforced plastic product.

It is also a principal object of this invention to describe a reinforced plastic product of improved strength characteristics.

It is another object of this invention to describe a method of treating a glass surface to render it particularly receptive to polyester resins having a silane dissolved therein.

It is an object of this invention to provide a process for the treatment of glass fiber as it is drawn, which process renders the fiber particularly receptive to resins.

The above noted and other objectives are attained, broadly speaking, by drawing fibers from a pot of molten glass and treating the same with an acid and binder as they are drawn; contact with the humidity of the air may partly accomplish a hydrolysis at the fiber surface and the acid, whether applied alone or in the binder, fosters the hydrolysis when the acid or acidic binder is prepared as described hereinafter. The binder is then dried on the fibers. The dried binder-coated fibers may be stored, shipped or formed into an article of manufacture as now generally described.

To form the article of manufacture a small quantity of an unsaturated organo-silicon is mixed together with the polyester resin and the solution attained is applied directly to the acid-binder treated glass and cured. The physical form of the binder treated glass may be as described hereinbefore for this purpose.

It is to be noted that it has been found that if the quantity of organo-silicon dissolved in the polyester lies between about 0.3 and 1.0 percent by weight of the composition that a materially superior bonding is achieved when the composition is employed in glass reinforced products.

While many organo-silicons containing a double bond in the organic portion of the molecule are useful in the practice of this invention, we have found that triethoxy-vinyl silane is particularly suitable. Others which may be advantageously employed include dimethoxy vinyl silane, mono-methoxy vinyl silane, di-methoxy allyl silane; tri-methoxy allyl silane; di-ethoxy allyl silane, tri-ethoxy allyl silane and di-allyl methyl ethoxy silane. It will be noted that each of these compounds contains an alkoxy radical but it is to be understood that aryloxy radicals would also be effective.

As the polyester components we prefer styrene-unsaturated polyester copolymers, such as the unsaturated alkyd resins, copolymerized with styrene, which resins are not specific chemical compounds but are clear liquid thermosetting condensation products of varying composition and chain length; however other polyesters including the allyl esters such as diallyl phthalate and allyl diglycol carbonate are also well suited for use in the invention.

We have found that it is essential to the attainment of optimum wet strength results that the glass fibers be acid treated prior to the application of the resin-silane composition and that the pH range should be as described hereinafter.

In the acid treatment it is considered that the alkali silicate on the glass reacts with the acid resulting in the formation of hydroxyl groups substantially in accordance with the following formulae:

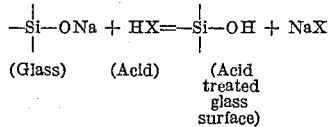

or

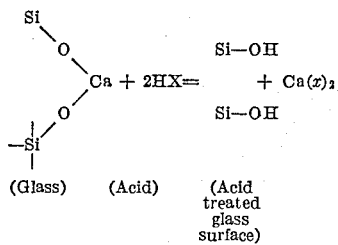

The acid treated glass cloth thus attained is dried over a slasher at about 200° F. for use in glass reinforced products and must be dry when so applied as the polyesters and water are incompatible.

It is further considered that a reaction takes place between the acid treated glass and the silane, as for example, a methoxy vinyl silane as follows:

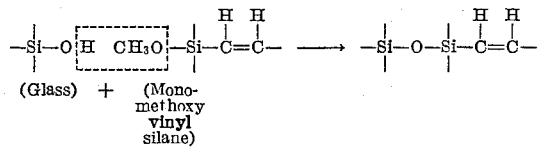

It is to be noted that the glass is thus securely bound to the silane and as will be understood the silane itself may contain in place of the hydrogen radicals other oxy groupings of the alkyl or aryl type which are similarly reactive with additional hydroxyl groupings of the glass. The unsaturated group of the silane coupling agent induces copolymerization with the polyester and accordingly coupling takes place readily and very probably in the first stages of heat application.

The acid treatment described above is preferably effected by an acid contained in a lubricating and binding composition which composition is applied at the pad and is itself now described.

The binder composition comprises a binding agent of resinous nature, an acid of carefully controlled pH and a lubricant.

The binding agent is preferably polyvinyl acetate in emulsion form and for the purposes of this invention the product produced by the E. I. du Pont Company under the trade name of "Elvacet 83–1200" is useful.

A polyvinyl acetate emulsion (55% solids) may be advantageously employed in the binder composition to the extent of about 1 to 15 percent by weight thereof.

The acid constituent of the binder may be organic or inorganic but the lower aliphatic acids such as formic and acetic are to be preferred. It is essential, for example, that the pH of the binder composition be maintained between about 2.5 to 4.0 and preferably between about 3.0 to 3.3; these latter acids are rather readily controlled while the highly ionized mineral acids such as hydrochloric and sulfuric are difficult to maintain at the optimum levels. In general and varying somewhat with the nature of the acid, the weight percent of acid will lie between about .01 percent to .1 percent of the composition; thus .05 percent by weight of HCOOH has been found to be very effective for the purposes of this invention. In any event the acid employed should be within the noted pH range.

While substantially any of the liquid polyhydric alcohols may be suitably employed in the binder as a lubricant the polyethylene glycols are to be preferred. These latter polymers are commercially available in selected average molecular weight ranges and are readily soluble in the water of the binder; they are effective dispersants, a characteristic which increases with increasing molecular weight. However for the purposes of this invention the polyethylene glycols having average molecular weights of about 200 are substantially equivalent to those having average molecular weights of about 600. Constituents which may be utilized as the lubricant include glycerine, ethylene glycol, propylene glycol and glyceryl maleate containing a molecular excess of glycerine. Preferably the weight percent of the lubricant is between about 0.25 percent to 2.5 percent of the composition.

The lubricant serves a triple function in the binder. The first function, a lubricating action takes place after the binder is dried on the fibers; friction may then tend to occur between the fibers themselves and this lubricating action is of considerable benefit in reducing the same and is of value in the formation of the fibers into strands and rovings. The second important function of the lubricant is as that of a wetting agent for the polyester resin in the lamination process whereby the impregnation with the laminating resin is facilitated. The third action of lubricants such as polyethylene glycol stems from the ability of such lubricants to film the fibers and to be retained thereby which apparently aids penetration by the polyester subsequently applied resulting in improved translucency and strength of the reinforced product. In this connection it has been noted that the break in test pieces is less fibrous when polyethylene glycol is incorporated.

Referring now more specifically to embodiments of the invention the formation of the polyester-silane composition may be illustrated by the mixing of an unsaturated organo-silicon with the polyester. Thus triethoxy-vinyl-silane to the extent of about 0.5 percent by weight stirred into the liquid comprised of a styrene monomer and an unsaturated alkyd form a composition having the properties required for this invention.

It is to be noted that while the weight percentage of the silane is not critical the preferable range is from about 0.3 to 1.0 percent by weight of the polyester-silane composition.

In another example about 0.7 percent by weight of tri-ethoxy-vinyl silane stirred into a diallyl phthalate yields equivalent results to the composition described above.

Similarly, 0.7 percent by weight of either di or tri methoxy allyl silane dissolved in a polyester such as monomeric styrene and a glycol ester of maleic acid are quite satisfactory.

In application then glass fibers emerging from a pot are treated with the binder and become coated with a film thereof. The collected fibers may be in strand form in parallel relationship and have no twisting and the binder of invention is particularly efficient in serving to retain the fibers within the strand form. This is important productionwise for when attempting to unwind a strand from a wound package thereof there is a tendency normally for a loose fiber to continue to break away from the main body of the strand as it is unwound, which results in the development of a fuzz about the package as unwinding continues, ultimately causing the breaking away of other fibers and resulting in package destruction. The capability of the binder to adequately bond the untwisted fibers and to eliminate fraying results directly in minimizing handling difficulties.

In the case of continuous filaments broken ends of individual fibers which may result from the forming process are similarly retained by the binder; when wound on packages the filaments may be readily unwound for processing in the usual textile apparatus and the binder facilitates these operations.

The dried binder on the glass surface is further useful due to the moisture repellent nature thereof, to provide articles fabricated therefrom with a high degree of moisture resistance—such a characteristic is exhibited for example by the binder-treated glass fabric when impregnated with the polyester-silane composition already described. Thus when forming laminates of the binder-treated glass it is not only not necessary to remove the binder but the presence of the binder has particular value in the finished product.

Such a product, that is, a reinforced plastic or a laminate may be formed by impregnating each glass surface carrying the binder with the silane-polyester composition and then arranging the impregnated sheets in layer form whereafter heat and pressure are applied to compact and harden the mass; alternatively glass fibers carrying the binder may be arranged in layers, impregnated as a unit, and then subjected to the application of heat and pressure to form a complete laminate. The maximum temperature employed in forming the laminate does not exceed 250° F. and in general the relatively low temperatures used for normally curing polyesters may be employed. The articles of manufacture so produced are translucent and highly water resistant.

In the accompanying drawing to which reference is made hereinafter:

Figure 1 illustrates in a diagrammatic elevational view one form of apparatus for the grouping of fibers and the coating thereof; and Figure 2 is an illustration indicating one possible relationship of the binder to the drawn glass filaments.

Referring now to a specific example of the process applicable when the acid-binder treatment is effected on newly drawn glass filaments the binder-lubricant composition may be first prepared as follows:

| | Parts by weight, percent |
|---|---|
| Polyvinyl acetate in emulsion form | .5 |
| Polyethylene glycol (average molecular weight 200) | .5 |
| Aqueous solution of HCOOH (HCOOH in sufficient concentration to give composition a pH of 3.0 to 3.3) | 94.5 |
| | 100.0 |

A polyvinyl acetate emulsion which may be employed in the foregoing formula has the following properties:

| | |
|---|---|
| Viscosity cp. @ 25° C | 10.0–14.0 |
| Solids, percent minimum | 55 |
| pH | 4–6 |
| Monomeric vinyl acetate | 1.0 |
| Heat sealing temperature | 50–60° C. |
| Mechanical stability | Good |
| Particle size average | 1–3 |
| Bond strength | 2200 p. s. i. |
| Stability under acid conditions | Excellent |

It is to be noted that the foregoing product is stable under the preferred acid conditions for the practice of this invention and is stable even at a pH of 1.5 when freshly prepared.

It is also to be noted that the polyvinyl acetate in this instance is partially polymerized to an average molecular weight of about 30,000.

This binder may then be applied to a suitable pad as indicated generally at 1 of Figure 1 and fibers 3 of glass emanating from the pot 5 are passed over the pad to pick up the binder. The fibers are then passed to a winding drum or tube 7 and dried.

The glass utilized may be any glass which may be drawn—however the standard commercial "E" is customarily employed. Also the procedure is adapted, as noted hereinbefore, for various physical arrangements of the drawn fibers and is particularly useful in connection with roving production.

To produce rovings the individual fibers, approximately 200 of them, may be formed into a single strand held together by the binder, the twist of the strand being very slight. Sixty of these strands may then be combined into a roving which is a loose assemblage of the strands having very little twist. Due to the nature of the material and the loose physical grouping these rovings are normally relatively difficult to handle in customary production lamination processes, but handling is much facilitated by the present invention as the binder does not tend to pull off when the fibers are manipulated.

The formed roving is thoroughly dried before lamination, as water and the polyesters are incompatible. Triethoxy vinyl silane dissolved to the extent of about 0.5 percent by weight into the liquid polyester of a styrene monomer and an unsaturated alkyd is a suitable resinous impregnant for the laminate formation.

The dried rovings are saturated with this material, layered, and then subjected to the application of heat and pressure to form the laminate. The maximum temperature employed in forming the laminate should not exceed 250° F. generally as temperatures much in excess of this apparently tend to reduce the abundance of hydroxyl groupings on the glass surface, probably by a dehydrating action.

Consistent improved results are attained as to laminate strength by use of the process described, and there follows a comparative test report between rovings as ordinarily produced and rovings produced by the method of this invention.

Carefully controlled comparative tests were made with rovings, by formation of parallel fiber laminates, and the test conditions were in all instances equivalent.

One method of effecting laminations currently being adopted in some sections of the industry gave results as follows: 95,000–105,000 p. s. i. dry, at a binder content of 0.9 to 1.1 percent by weight; and 65,000–75,000 p. s. i. after a 2-hour boil.

In contrast to the foregoing the following data were obtained when practicing the procedure of this invention:

| Dry Flexural Strength, p. s. i. | 2-Hour Boil Flexural Strength, p. s. i. | Strength Retention | Binder Content, Percent |
|---|---|---|---|
| 116,000 | 99,750 | 84 | 0.390 |
| 114,650 | 101,500 | 88.6 | 0.335 |
| 107,200 | 105,600 | 98 | 0.297 |
| 110,000 | 108,000 | 98 | 0.511 |
| 116,200 | 103,500 | 89 | 0.262 |
| 114,300 | 101,500 | 88.8 | 0.309 |
| 117,000 | 109,700 | 93.7 | 0.400 |
| 116,200 | 101,000 | 87 | 0.393 |
| 119,100 | 102,200 | 85.7 | 0.280 |
| 116,900 | 102,300 | 87.5 | 0.302 |
| 119,000 | 101,600 | 84.7 | 0.242 |

A very important factor to be noted with respect to this data is that the percentage of strength retention, after the boil treatment, is less for the present commercial process than for the process of this invention; thus in the first case the strength retention is at best less than 80 percent, while the process described herein generally tops 85 percent and frequently exceeds 95 percent. This is considered by the industry to be an important criteria of bond value and exceeds present government specification requirements. This retention factor is of very considerable value in the designing of light weight equipment, as for aircraft, for clearly less material need now be employed to attain a given strength requirement.

A further important factor is that the percentage of binder required for the inventive product is relatively low—0.3 to 0.5 percent by weight in contrast to that of the known art which requires in excess of 1 percent for the best results attainable.

The illustration set forth in Figure 2 affords a possible explanation of these improved results. In the figure the numeral 9 indicates a series of parallel fibers; the polyvinyl acetate which is present in the emulsion in the form of small particles apparently deposits on the glass in substantially the form indicated at 11 and hence tends to provide spacings. The polyethylene glycol of the binder then tends to film over and coat the polyvinyl acetate particles as well as the glass, as at 13, while leaving spacings for the entry of the polyester having the silane dissolved therein. This together with the attractive forces induced by the acid treatment as set out hereinbefore apparently occasions the much improved results.

The results attained by the foregoing procedure are producible production-wise, it having been found over a 3-day run that the dry strength averages 116,000 p. s. i. while the strength after a 2-hour boil averages 100,000 p. s. i. to give a strength retention of close to 90 percent average.

It will thus be noted that consistent with the foregoing stated objectives applicant has (a) provided an improved laminate; (b) provided an improved process; and (c) provided a new and improved binder composition.

The terms "hydroxyl groupings," "hydrolyzed glass surfaces," and similar phrases as they appear in the specification and claims relate to the condition of the glass surface after acid treatment in accordance with the invention and are not to be construed as limitative other than in accordance with the stated acid treatment.

It will be understood that this invention is susceptible to modification in order to adopt it to different usages and conditions and accordingly, it is desired to comprehend such modifications within this invention as may fall within the scope of the appended claims.

We claim:

1. In a method of drawing glass fibers, the step of coating the fibers as they are drawn with a binder composition, comprising an aqueous emulsion having from 1 to 15 percent by weight of polyvinyl acetate, about 0.25 to 2.5 percent of a liquid polyethylene glycol, and an amount of acid such that the pH of the emulsion is between about 2.5 and 4.0.

2. A method as defined in claim 1, in which the binder composition has a pH between 3.0 and 3.3.

3. A method of making a glass fiber reinforced resinous product, comprising forming a plurality of fine glass fibers from molten glass, coating the fibers as they are formed with a binder composition comprising an aqueous emulsion having from 1 to 15 percent by weight of polyvinyl acetate, about 0.25 to 2.5 percent of a liquid polyhydric alcohol and an amount of acid such that the pH of the emulsion is between about 2.5 and 4.0, grouping said fibers into a strand, placing the strand in a resinous material comprising an unsaturated organo silane dissolved in a polyester, and curing said resin to form a reinforced resinous product.

4. A method of forming a resinous product as defined in claim 3, in which the polyhydric alcohol of the binder is polyethylene glycol.

5. A method of making a resinous product as defined in claim 4, in which the unsaturated organo silane dissolved in the polyester is present in an amount between 0.3 and 1.0 percent by weight.

6. A method of making a resinous product as defined in claim 5, in which the silane is vinyl triethoxy silane.

References Cited in the file of this patent

UNITED STATES PATENTS

| | | |
|---|---|---|
| 2,383,469 | Colbert et al. | Aug. 28, 1945 |
| 2,387,967 | Zimmerman | Oct. 30, 1945 |
| 2,390,370 | Hyde | Dec. 4, 1945 |
| 2,563,288 | Steinman | Aug. 7, 1951 |
| 2,588,543 | Kunze et al. | Mar. 11, 1952 |
| 2,595,952 | Kunze et al. | May 6, 1952 |
| 2,605,243 | Sowa | July 29, 1952 |
| 2,649,396 | Witt et al. | Aug. 18, 1953 |
| 2,700,010 | Balz | Jan. 18, 1955 |
| 2,723,215 | Biefeld et al. | Nov. 8, 1955 |

OTHER REFERENCES

"Elvacet," Polyvinyl Acetate Water Emulsions, Vinyl Products Bulletin V-3-1147, E. I. du Pont de Nemours & Co., Wilmington, Delaware, p. 2, January 29, 1948.

Modern Plastics, March 1946, Silicone resin bonded laminates, pp. 160–162, 192 and 194.

Modern Plastics, November 1944, Silicones—high polymeric substances, pp. 124–126, 212 and 214.